UNITED STATES PATENT OFFICE.

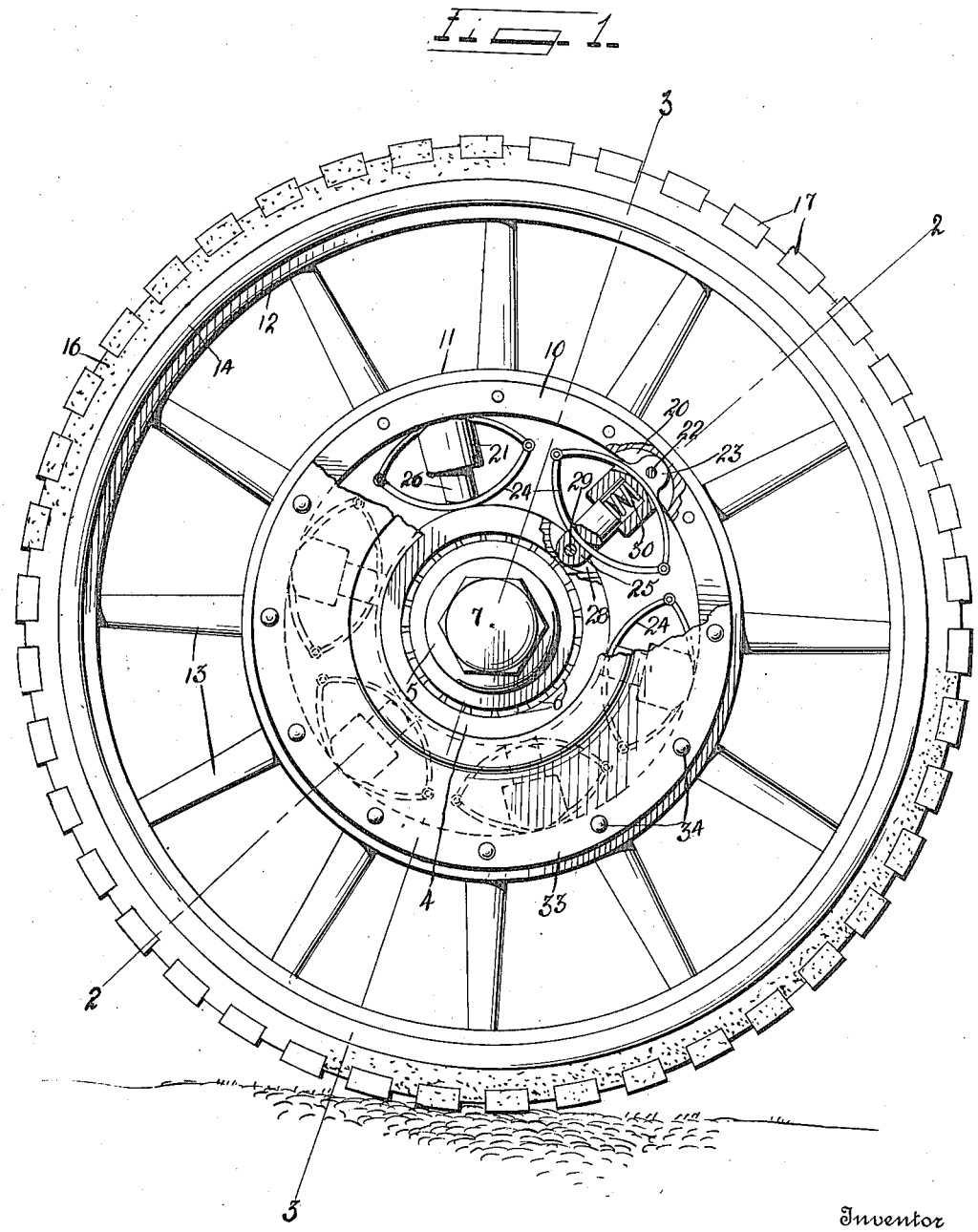

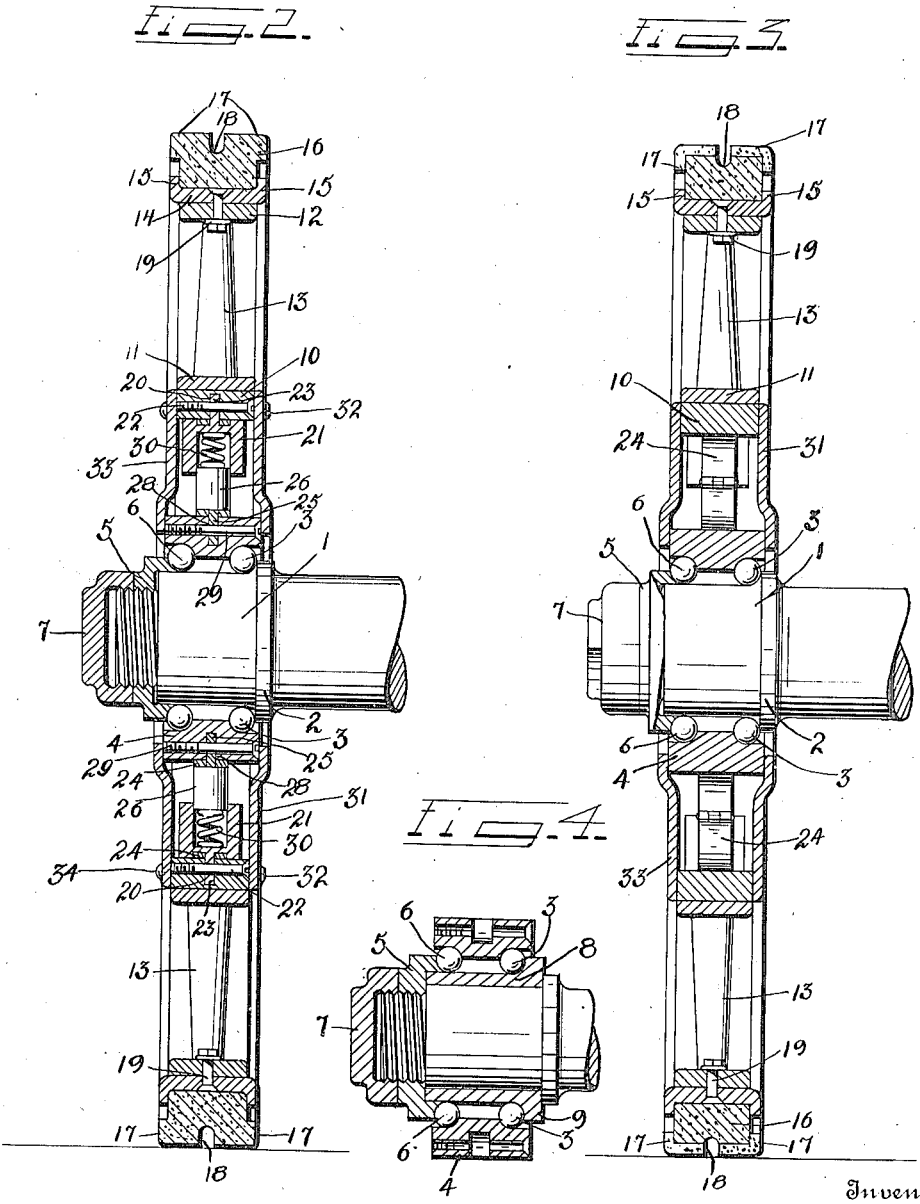

ROBERT RUTHERFORD, OF PORTLAND, OREGON.

SPRING-WHEEL.

1,063,219.

Specification of Letters Patent.  Patented June 3, 1913.

Application filed July 6, 1911. Serial No. 637,090.

*To all whom it may concern:*

Be it known that I, ROBERT RUTHERFORD, a citizen of the United States, residing at Portland, in the county of Multnomah, State of Oregon, have invented certain new and useful Improvements in Spring-Wheels; and I do hereby declare the following to be a full, clear, and exact description of the invention, such as will enable others skilled in the art to which it appertains to make and use the same.

This invention relates to improvements in wheels, more particularly to the class of the spring wheels employed upon automobiles and like vehicles, and has for one of its objects to improve the construction and increase the efficiency and utility of devices of this character.

Another object of the invention is to provide a wheel of this character wherein provision is made for preventing the "sluing" or skidding of the machine to which it is attached.

Another object of the invention is to provide a wheel of this character wherein a double set of spring devices are employed which reinforce and supplement each other and absorb the jars and concussions which would otherwise be communicated to the body of a vehicle.

With these and other objects in view, the invention consists in certain novel features of construction as hereinafter shown and described and then specifically pointed out in the claim; and, in the drawings illustrative of the preferred embodiment of the invention, Figure 1 is a side elevation of the improved wheel partly in section, Fig. 2 is a section on the line 2—2 of Fig. 1, Fig. 3 is a section on the line 3—3 of Fig. 1. Fig. 4 is a sectional detail illustrating a modification in the construction.

The axle journal of the improved wheel, represented at 1, is provided with a stop collar 2 against which an inner set of bearing balls 3 bears, while an outer set of balls is spaced from the inner set, as shown in Figs. 2 and 3. The hub 4 of the improved wheel is provided with annular seats spaced apart and operating between the bearing balls. The outer end of the journal is reduced and threaded, as shown to receive a cone collar 5 which bears against the outer balls 6 and is secured in position by a clamp nut 7, as shown.

When the improved device is applied to vehicles already constructed a bearing sleeve 8 may be employed, as shown in Fig. 4, the sleeve having a similar stop collar 9, corresponding to the stop collar 2 and the outer surface of the sleeve corresponding to the outer portion of the journal upon which the balls 3—6 bear. It will be understood that this slight change does not constitute a departure from the principle of the invention and either may be employed, as preferred.

Surrounding the hub 4 and spaced therefrom is a ring 10, the ring and hub being of metal preferably of steel. Surrounding the ring 10 is an inner felly member 11 preferably of wood, and surrounding the inner felly member and spaced therefrom is an outer felly member 12, the two felly members being connected by a plurality of spokes 13 preferably of wood of the usual form. Surrounding the outer felly 12 is a tire band 14 having outwardly turned edges 15 forming flanges to support the tire, the latter being preferably of relatively hard tough rubber or like material and represented at 16. The tire is provided upon its outer face with two sets of spaced projections 17, the projections being located in two rows around the periphery of the tire with a cavity or annular groove 18 in the tire and between the two sets of the projections 17, as shown. By this means a surface is produced which will cause the wheels to closely bind upon the ground over which the machine moves, and materially increases the friction and tractive force and thereby effectually prevents all tendency to "slue" or "skid" when moving over smooth or slippery surfaces, or when running around curves. The tire band 14 is preferably secured by bolts 19 or similar fastening devices to the felly member 12, as shown. The projections 17 also obviate the necessity for using "anti-skidding chains" or like appliances.

The intermediate ring 10 is provided with a plurality of spaced apart recesses 20 in each of which is pivotally mounted a cup box 21, said boxes being secured therein by means of bolts 22 passed through ears 23 of the boxes, said ears extending into the recesses 20. As shown the recesses are so proportioned as to allow radial swinging of the boxes but to absolutely prevent all side motion thereof. Each of the cup members 21 is provided with a transverse recess through which the outer member of a leaf-spring 24 passes, said member being slotted to engage over the ear 23 whereby it is held in place. The opposite side of each leaf-spring is secured by passing the ear 25 of a plunger 26 through a suitable slot in the spring, said ear being seated in a recess 28 formed in the hub 4 and secured in place by a bolt 29 as shown in Figs. 1 and 2, said recess being identical in construction to the recesses 20. The free ends of said plungers are seated in the cup boxes 21. Disposed within each of the cup-boxes 21 is a coiled spring 30 which bears at its ends against the closed end of the cup-box and upon the inner end of one of the plungers 26. By this simple arrangement it will be obvious that when the wheel is running over rough ground that the concussions and jars to which it will be subjected will be received by the co-acting springs 24—30 and thereby prevented from being communicated to the body of the vehicle, so that an effectual cushioned wheel is produced which is very strong, durable and wherein the parts co-act to effectually prevent any lateral movement or displacement of the parts.

Surrounding the axle journal 1 at the inner face of the wheel is a guard disk 31 the latter bearing at its outer edge against the inner face of the ring 10 and secured thereto by a plurality of clamp bolts 32. Surrounding the axle 1 externally of the wheel body is another guard disk 33 corresponding to the disk 31 and bearing at its outer edge against the outer edge of the ring 10 and secured in position by clamp bolts 34. By this means the internal mechanism of the wheel is covered and protected.

What I claim is:—

In a wheel, a felly member having a series of recesses in its inner face, a hub member having a series of recesses in its outer face, radially disposed cups, apertured lugs on the cups disposed in the recesses, transverse bolts pivotally connecting the lugs to the felly member, radially arranged plungers slidaby engaged in the cups, apertured lugs on the plungers pivotally secured in the recesses of the hub member, coil springs in the cups, elliptical springs comprising outer and inner members, each of the cups having a groove on each side of its lug, the said outer member of each of the elliptical springs having a slot which receives the said lug, the portions of said member adjacent the slot being disposed in the said grooves, the inner member of each of said elliptical springs having a slot which receives the lug of one of the cups.

In testimony whereof, I affix my signature, in presence of two witnesses.

ROBERT RUTHERFORD.

Witnesses:
H. G. SCHNEIDER,
F. G. WILDE.